United States Patent
Mussmann et al.

(10) Patent No.: US 6,294,140 B1
(45) Date of Patent: *Sep. 25, 2001

(54) LAYERED NOBLE METAL-CONTAINING EXHAUST GAS CATALYST AND ITS PREPARATION

(75) Inventors: Lothar Mussmann, Offenbach; Dieter Lindner, Hanau; Michael Harris, Münster; Thomas Kreuzer, Karben; Egbert Lox, Hanau, all of (DE)

(73) Assignee: Degussa AG, Hanau (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/409,744

(22) Filed: Oct. 1, 1999

(30) Foreign Application Priority Data

Apr. 23, 1999 (EP) .................................................. 99108061

(51) Int. Cl.$^7$ .............................. B01D 53/94; B01J 21/00
(52) U.S. Cl. ................................ 423/213.5; 423/239.1; 423/245.3; 423/247; 502/302; 502/303; 502/304; 502/325; 502/326; 502/332; 502/349; 502/514; 502/527.12
(58) Field of Search ................................... 502/302, 303, 502/304, 325, 326, 332, 349, 514, 527.12; 423/213.5, 239.1, 245.3, 247

(56) References Cited

U.S. PATENT DOCUMENTS

| | | | |
|---|---|---|---|
| 4,528,279 | * 7/1985 | Suzuki et al. | 502/200 |
| 5,057,483 | 10/1991 | Wan | 502/304 |
| 5,063,192 | 11/1991 | Muralami et al. | 502/303 |
| 5,196,390 | * 3/1993 | Tauster et al. | 502/251 |
| 5,490,977 | * 2/1996 | Wan et al. | 423/210 |
| 5,677,258 | 10/1997 | Kurokawa et al. | 502/303 |
| 5,753,580 | * 5/1998 | Hayashi et al. | 502/304 |
| 5,849,660 | * 12/1998 | Takemoto et al. | 502/327 |
| 5,874,057 | * 2/1999 | Deeba et al. | 423/239.1 |
| 5,958,828 | * 9/1999 | Murakami et al. | 502/333 |
| 6,103,660 | 8/2000 | Yperen | 502/327 |
| 6,107,239 | * 8/2000 | Qin et al. | 502/300 |

FOREIGN PATENT DOCUMENTS

| | | |
|---|---|---|
| 2234348 A1 | 4/1998 | (CA). |
| 197 14 707 A1 | 10/1998 | (DE). |
| 197 14 732 A1 | 10/1998 | (DE). |
| 197 26 322 A1 | 12/1998 | (DE). |
| WO 95/35152 | 12/1995 | (WO). |
| WO 98/16472 | 4/1998 | (WO). |

OTHER PUBLICATIONS

U. S. application No. 09/100,251, filed Jun. 19, 1998, (equivalent to DE 197 26 322 A1).

* cited by examiner

Primary Examiner—Steven P. Griffin
Assistant Examiner—Timothy C Vanoy
(74) Attorney, Agent, or Firm—Smith, Gambrell & Russell, LLP

(57) ABSTRACT

A catalyst for treating exhaust gas from an internal combustion engine includes a carrier body coated with an inner layer and an outer layer. The inner layer includes platinum deposited on a first support material and on a first oxygen storage component, and the outer layer includes platinum and rhodium deposited on a second support material and on a second oxygen storage component. The first and second support materials may be the same or different, and may be selected from the group of: silica, alumina, titania, zirconia, mixed oxides or mixtures thereof, and zirconia-rich zirconia/ceria mixed oxide. The first and second oxygen storage components may include ceria-rich ceria/zirconia mixed oxide compounds, optionally including praseodymia, yttria, neodymia, lanthana or mixtures thereof.

25 Claims, 1 Drawing Sheet

LAYERED NOBLE METAL-CONTAINING EXHAUST GAS CATALYST AND ITS PREPARATION

INTRODUCTION AND BACKGROUND

The present invention relates to a high performance three-way catalyst (TWC) containing an inner and an outer layer on an inert carrier body. The layers comprise noble metals from the platinum group deposited on support materials.

Three-way catalysts are primarily used to convert the pollutants carbon monoxide (CO), hydrocarbons (HC) and nitrogen oxides ($NO_x$) contained in the exhaust gas of internal combustion engines into harmless substances. Known three-way catalysts with good activity and durability utilize one or more catalytic components from the platinum group metals such as platinum, palladium, rhodium and iridium deposited on a high surface area, refractory oxide support, e.g., a high surface area alumina. The support is usually carried in the form of a thin layer or coating on a suitable carrier or substrate such as a monolithic carrier comprising a refractory ceramic or metal honeycomb structure.

The ever increasing demand for improved catalyst activity and life has led to complex catalyst designs comprising multiple catalyst layers on the carrier structures, each of the layers containing selected support materials and catalytic components as well as so called promoters, stabilizers and oxygen storage compounds.

U.S. Pat. No. 5,063,192 describes a three-way catalyst with improved resistance to thermal stresses which consists of a first and a second catalyst layer. The first layer is directly coated onto the surface of a monolithic honeycomb carrier and comprises active alumina and deposited thereon catalytic components comprising platinum and/or rhodium and at least one compound from zirconia, lanthana or barium oxide. The second layer is coated on top of the first layer and comprises active alumina, ceria and a catalytic component which comprises palladium. The oxides of zirconium, lanthanum and/or barium prevent the particles of active alumina from sintering due to high exhaust gas temperatures and thereby improve thermal resistance of the three-way catalyst.

U.S. Pat. No. 5,677,258 describes a three-way catalyst containing barium oxide with improved resistance against poisoning with sulphur and water. The catalyst consists of two layers on a honeycomb carrier. The lower catalyst layer is located directly on the carrier and comprises at least barium or lanthanum. The upper layer comprises a water adsorbing component. The catalyst further comprises a catalytically active metal which is located at least in the lower or upper layer. In a special embodiment the lower layer further comprises palladium and active alumina and the upper layer further comprises platinum and rhodium.

U.S. Pat. No. 5,057,483 discloses a three-way catalyst comprising two discrete layers on a monolithic carrier. The first, lower layer comprises a first activated alumina support, a catalytically effective amount of a first platinum catalytic component dispersed on the first alumina support, and a catalytically effective amount of bulk ceria. The second or outer layer comprises a co-formed rare earth oxide-zirconia support, a catalytically effective amount of a first rhodium catalytic component dispersed on the co-formed rare earth oxide-zirconia support, a second activated alumina support, and a catalytically effective amount of a second platinum catalytic component dispersed on the second alumina support.

PCT-Publication WO 95/35152 discloses another three-way catalyst, consisting of two layers, which is thermally stable up to 900° C. or more. The first layer comprises a first support; at least one first palladium component, optionally a first platinum group component; optionally at least one first stabilizer; optionally at least one first rare earth metal component and optionally a zirconium compound. The second layer comprises a second support; a second platinum component; a rhodium component; a second oxygen storage composition comprising a diluted second oxygen storage component; and optionally a zirconium component.

German publication DE 197 26 322 A1 describes a three-way catalyst which exhibits improved activity and thermal stability and which consists of two layers on an inert carrier. The first or lower layer comprises several particulate materials and one or more highly dispersed alkaline earth metal oxides and at least one platinum group metal which exhibits an intimate contact with all components of the first layer. The particulate materials of the first layer comprise at least one particulate oxygen storage material and at least one further particulate component. The second layer comprises again several particulate materials and at least one platinum group metal. The particulate materials of the second layer comprise at least a particulate oxygen storage material and a further particulate component. The platinum group metals of the second layer are deposited selectively on the particulate materials of the second layer. Preferably the platinum group metal in the first layer is palladium and the platinum group metals of the second layer are platinum and rhodium.

This latter three-way catalyst exhibits excellent catalytic activity especially during the cold start phase of modern internal combustion engines which are operated with lean air/fuel mixtures during cold start to increase the exhaust gas temperature as fast as possible. The excellent behavior of the catalyst is essentially due to the use of palladium which under lean exhaust gas conditions yields lower light off temperatures than platinum. Despite its excellent performance this catalyst faces the problem that there has developed a shortage in palladium supply during the last few years resulting in rising prices and an uncertain supply situation.

A further problem with existing three-way catalysts is the fact that they suffer under fuel-cut aging. The term fuel-cut aging describes catalyst performance degradation due to fuel-cut after high load operation of the internal combustion engine. Such a situation occurs frequently during fast driving phases when abrupt deceleration is required. During fast driving phases the engine is operated at air/fuel ratios slightly below the stoichiometric value. The exhaust gases may reach temperatures well above 800° C. resulting in even higher catalyst temperatures due to the exothermic conversion reactions at the catalyst. In case of abrupt deceleration modern motor electronics completely stop fuel supply to the engine with the result that the normalized air/fuel ratio (also called lambda value $\lambda$) of the exhaust gas jumps from rich to lean values.

These large excursions of the normalized air/fuel ratio from rich to lean values at high catalyst temperatures degrade catalytic activity. Catalytic activity can at least partly be recovered by prolonged operation under stoichiometric exhaust gas conditions. The faster catalytic activity is regained after fuel-cut aging, the better is the overall catalyst performance. Speeding up recovery of catalytic activity after fuel-cut aging is therefore mandatory for modern three-way catalysts.

An object of the present invention is to develop a three-way catalyst based on platinum and rhodium which exhibits a similar catalytic performance as known palladium/rhodium catalysts and which is commercially competitive to the latter. Further, after high temperature aging under lean exhaust gas conditions, the catalyst should recover its full three-way efficiency quickly. The catalyst should also exhibit an improved nitrogen oxide conversion to reduce the ozone forming potential of the cleaned exhaust gas.

SUMMARY OF THE INVENTION

These and other objects are achieved with a catalyst containing an inner and an outer layer on an inert carrier body comprising noble metals from the platinum group deposited on support materials. The catalyst is characterized in that the inner layer comprises platinum deposited on a first support and on a first oxygen storage component and the outer layer comprises platinum and rhodium deposited on a second support and the outer layer further comprises a second oxygen storage component.

The catalyst of the present invention consists of a catalytic coating comprising an inner and an outer layer on an inert catalyst carrier and therefore forms a so called double layer catalyst. The "inner layer" is meant to be the first layer of the catalytic coating deposited directly on the catalyst carrier. The inner layer is covered with the "outer layer" or second layer. The exhaust gas to be treated with the catalyst directly comes into contact with the outer layer.

The term "support material" or "support" is used in the present invention to designate a particulate material onto which catalytically active components such as the noble metals from the platinum group of elements or other promoter components can be deposited in highly dispersed form, i.e. with crystallite sizes between 1 and 10 nm. For that purpose, the support materials should have a specific surface area (also called BET surface, measured according to DIN 66132) of more than 5 $m^2/g$. The first and second oxygen storage components of the catalyst are also used in particulate form.

Without wanting to restrict the present invention to a particular theory, it is assumed that the contribution of the lower layer to the overall catalytic performance of the catalyst consists mainly in the oxidation of hydrocarbons and carbon monoxide while the main task of the outer layer is the reduction of nitrogen oxides. But the outer layer also contributes, particularly in the cold start phase, towards conversion of hydrocarbons and carbon monoxide.

The superior properties of the catalyst according to the invention with regard to fuel cut aging and nitrogen oxides conversion is mainly attributed to the fact that in the outer layer platinum and rhodium are deposited on the second support material only.

It was observed that depositing platinum and rhodium onto the same support material shortens the recovery time of catalytic activity after exposure to lean exhaust gas conditions at high temperatures. This in turn yields higher conversion efficiencies for nitrogen oxides over a full driving cycle. Depositing platinum and rhodium onto the same support material means in the context of the present invention that platinum and rhodium are dispersed on the same particles of the second support material, that is, platinum and rhodium are at least closely neighboured on the same particles. Further improvements can be obtained by ensuring an intimate contact between both noble metals. How this can be accomplished will be discussed further below.

According to the present understanding of the invention, the reasons for fuel cut aging of three-way catalysts may be that large excursions of the normalized air/fuel ratio from rich to lean values at high catalyst temperatures degrades the catalytic activity especially of rhodium. Under stoichiometric or rich exhaust gas conditions, rhodium is reduced nearly to the oxidation state zero which is the most effective state for three-way catalysis. Under lean exhaust gases and at high catalyst temperatures, rhodium gets oxidized up to oxidation level +3. This oxidation state of rhodium is less active for three-way conversion of pollutants. Moreover, since $Rh_2O_3$ is isomorphic in crystallographic structure to $Al_2O_3$ it can migrate at temperatures above 600° C. into the lattice of alumina or other isomorphic support oxides of the general composition $M_2O_3$ (M stands for a metal atom), resulting in a permanent degradation of catalytic activity.

To regain its catalytic activity and to avoid losses of rhodium into the lattice of alumina, rhodium must therefore be reduced as quickly as possible when the exhaust gas composition changes back to stoichiometry. According to the present understanding of the invention, reduction of rhodium to oxidation state zero is catalyzed by platinum. The more intimate the contact between platinum and rhodium is, the better is this reduction effect.

In addition, the tendency of $Rh_2O_3$ to migrate into isomorphic support oxides can be limited by appropriate doping of these oxides. Beneficial are doping components which are capable of generating activated hydrogen under reducing conditions. The activated hydrogen helps to convert rhodium oxide more rapidly into the metallic form under reducing conditions, and hence the risk of $Rh_2O_3$ migrating into the support oxide is further minimized. A suitable doping component for that purpose is cerium oxide (ceria). But since ceria also exhibits an oxygen storage and release capability the amount of doping with ceria must be kept low so as to not promote oxidation of rhodium by too high a level of ceria in the support oxide

BRIEF DESCRIPTION OF THE DRAWING

The present invention will be further understood with reference to the accompanying drawing, wherein.

DETAILED DESCRIPTION OF THE INVENTION

Figure 1:
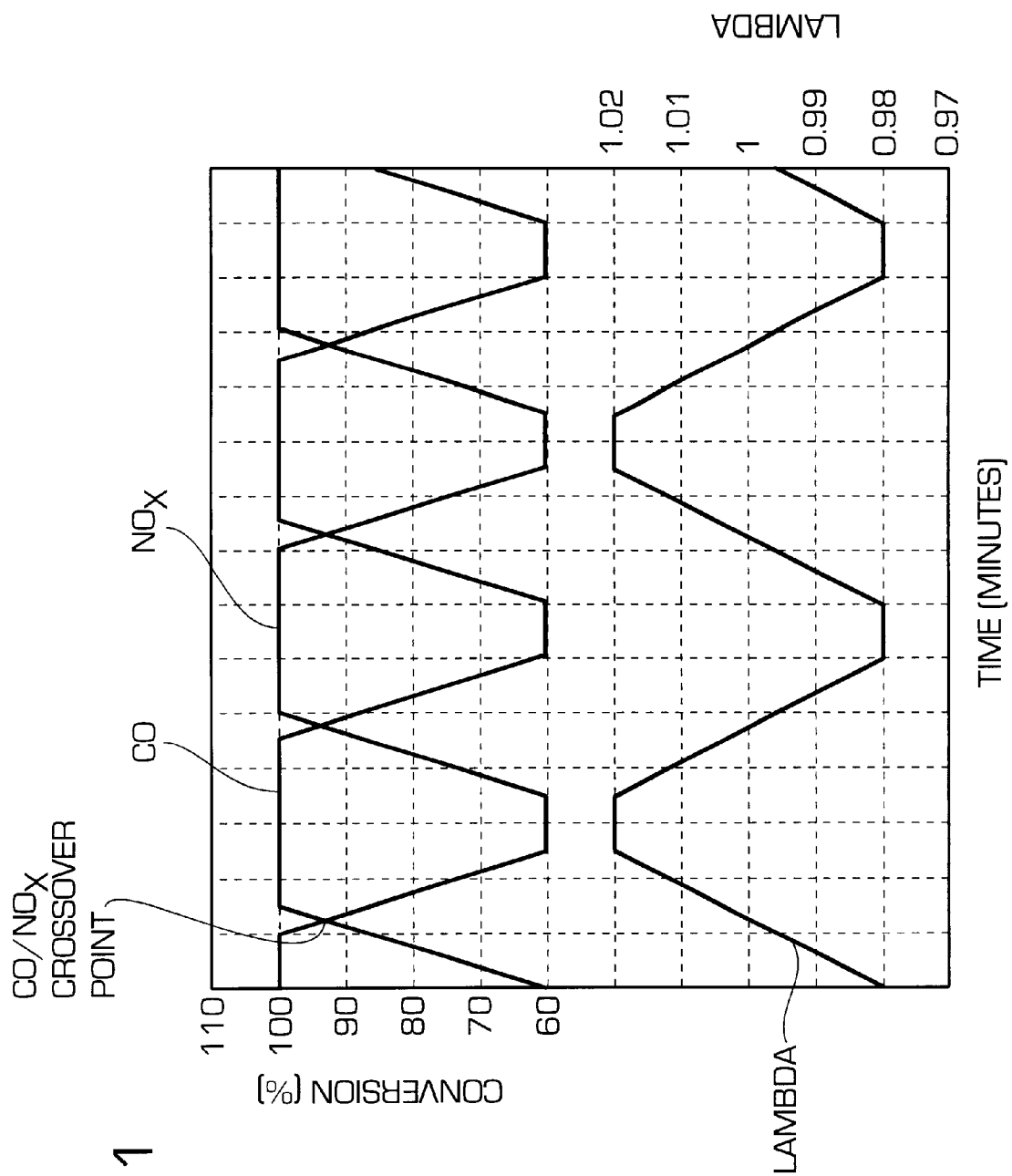
FIG. 1 shows a schematic representation of the measuring principle for determining CO/NOx cross-over points.

Specific embodiments of the catalyst according to the invention will now be explained in more detail.

The first and second supports of the catalyst may be the same or different. Preferably, the first and second supports are selected from the group consisting of silica, alumina, titania, zirconia, mixed oxides or mixtures therefrom. The term "mixed oxide" designates an intimate mixture of two or more oxides on an atomic level which may be regarded as a new chemical compound, while the term "mixture" designates the mechanical mixture of two or more particulate oxide materials.

Most advantageously, the supports are selected from activated aluminas, optionally complemented by zirconia or a zirconia-rich zirconia mixed oxide. Activated aluminas exhibit specific surface areas of up to 400 $m^2/g$. They comprise the various phases from the transition aluminas which are formed by heating aluminum hydroxides in air (see Ullmann's Encyclopaedia of Industrial Chemistry; Fifth Edition, 1985, Volume A1, pages 561 and 562). For improved temperature stability, the active aluminas can be stabilized with 0.5 to 20 wt. % of lanthana. Such materials are commercially available. The frequently used stabilization of alumina with barium oxide (baria) is less preferred if alumina is used as support material for platinum because this bears the risk of formation of barium platinate.

The term "zirconia-rich" means that the material contains at least more than 50% by weight of zirconia, preferably more than 60 and most preferably more than 80% by weight, the balance being formed by yttria, neodymia, calcium oxide (calcia), silica, lanthana or ceria, which serve to stabilize zirconia against thermal stresses. Most preferably a zirconia-rich zirconia/ceria mixed oxide is used. Pure zirconia and the stabilized zirconia compounds will be summarized under the term "zirconia component" in the following.

The inner or first layer of the catalyst contains, in addition to stabilized alumina and the optional zirconia component, an oxygen storage material for improved three-way conversion of the pollutants. Ceria is well-known to exhibit an oxygen storage capability. Under lean exhaust gas conditions, cerium is completely oxidized to the oxidation state $Ce^{4+}$. Under rich exhaust gas conditions ceria releases oxygen and acquires the $Ce^{3+}$ oxidation state. Instead of using pure ceria as an oxygen storage compound, it is preferred to use ceria rich ceria/zirconia mixed oxide compounds with a ceria concentration of from 60 to 90 wt. % relative to the total weight of the mixed oxide. Such materials are available with specific surface areas of 20 to 200 $m^2/g$ and exhibit a good temperature stability of the surface area. Further improvements can be obtained by stabilizing this material with praseodymia, yttria, neodymia, lanthana or mixtures thereof. For stabilization concentrations of the stabilizing compounds of from 0.5 to 10 wt. %, relative to the total weight of the stabilized material, are sufficient. Stabilizing of oxygen storage materials based on ceria using praseodymia, neodymia, lanthana or mixtures thereof is described in German patent application DE 197 14 707 A1.

According to the present invention, both the support materials and the oxygen storage compound serve as supports for platinum in the first layer. Depositing platinum on only one of these materials has proved to yield inferior catalytic activities.

The oxygen storage material of the outer layer may be the same as, or different from, the storage material of the inner layer. It is preferred to use the same storage material for the inner and outer layer, especially ceria/zirconia mixed oxides stabilized with praseodymia. The second oxygen storage material of the outer layer must be kept free from rhodium. Depositing rhodium on the second oxygen storage material would lead to deactivation of rhodium's reducing activity by oxidation of rhodium.

The outer or second layer may further comprise a certain quantity of active alumina in particulate form which serves as a diluting material. This material may or may not be stabilized with lanthana or baria.

Further improvements of catalytic activity and temperature stability can be obtained if the second layer is complemented with a highly dispersed component selected from the group consisting of yttria, neodymia, lanthana or praseodymia, with praseodymia being preferred. These compounds may be introduced into the layer by adding a soluble precursor compound of these compounds to the coating composition of the second layer.

The term "dispersed component" means that, contrary to a "particulate component", this material is added to the coating composition in the form of a soluble precursor compound which acquires its final dispersed form upon calcining of the catalytic coating. The average particle size of dispersed components may range between 0.001 and 0.1 $\mu m$, while particulate components usually exhibit mean particle diameters between 1 and 15 $\mu m$.

The dispersed component of the second layer serves multiple functions. At first, it stabilizes the particulate components (alumina support and ceria/zirconia oxygen storage component) of the second layer against thermal degradation. Therefore, when adding, e.g., praseodymia in dispersed form to the second layer, ceria/zirconia must not be stabilized beforehand, but will be stabilized in situ during the manufacture of the coating. Secondly, praseodymia exhibits also an oxygen storage and release function which helps to improve the dynamic behavior of the final catalyst, though the oxygen storage capability of praseodymia is not so pronounced as that of ceria.

The catalyst carrier body used in the present invention is in the form of a honeycomb monolith with a plurality of substantially parallel passage ways extending therethrough. The passage ways are defined by walls onto which the catalytic coating comprising the inner and the outer layer is applied.

The passage ways of the carrier body serve as flow conduits for the exhaust gas of the internal combustion engine. When flowing through these passages, the exhaust gas comes into close contact with the catalytic coating, whereby the pollutants contained in the exhaust gas are converted into benign products. The carrier bodies may be manufactured from any suitable material, such as from metallic or ceramic materials, as is well known in the art. The passage ways are arranged in a regular pattern over the cross section of the carrier bodies. The so-called cell density (passage ways per cross sectional area) may vary between 10 and 200 $cm^{-2}$. Other suitable carrier bodies may have an open cell foam structure. Metallic or ceramic foams may be used.

The inner layer of the catalytic coating is applied to the carrier body in amounts of from about 50 to 250 g/l, and the outer layer is applied in amounts of from 10 to 150 g/l of the carrier body. Advantageously, the inner layer comprises of from 20 to 150 g/l of said first support component and from 10 to 100 g/l of said first oxygen storage component. The inner layer may further comprise 5 to 60 g/l of zirconia or of a zirconia component. Platinum is present in the first layer in concentrations of from 0.01 to 5, preferably from 0.05 to 1 wt. %, relative to the total weight of the first layer. The concentration of platinum relative to the volume of the catalyst carrier ranges from 0.01 to 12.5 g/l, with concentrations between 0.025 and 2 g/l being most suitable.

In a most preferred embodiment, the first support comprises an active alumina with a specific surface area between 50 and 200 $m^2/g$ stabilized with lanthana, while the first oxygen storage component is advantageously selected from ceria rich ceria/zirconia mixed oxides containing 60 to 90 wt.-% of ceria and additionally stabilized with 0.5 to 10 wt. % of praseodymia ($Pr_6O_{11}$). This composition of the first layer is believed to improve its catalytic function with respect to the oxidation of hydrocarbons (HC) and carbon monoxide (CO).

The outer layer of the catalytic coating comprises from 5 to 100, preferably from 5 to 20 g/l of said second support, and from 5 to 100, preferably from 5 to 50 g/l of said second oxygen storage component. The outer layer may further comprise from 5 to 60 g/l of activated alumina. In the outer layer, platinum and rhodium are deposited on the second support. Compared to the inner layer, the concentration of the noble metals relative to the weight of the supporting material is preferably higher in the outer layer. Thus, concentrations of platinum plus rhodium between 0.5 and 20 wt. % relative to the weight of the second support material may be selected with concentrations between 1 and 15 wt. % being preferred. These concentrations correspond to concentrations relative to the volume of the catalyst carrier between 0.025 and 20 g/l, preferably between 0.05 and 15 g/l.

As already explained, platinum in close contact to rhodium in the outer layer helps to reduce rhodium oxide formed during fuel-cut-off phases back to the metallic state. For performing this task, the mass ratio between platinum and rhodium should be selected between 5:1 and 1:3. Mass ratios between 3:1 and 1:1 are most effective.

As in the case of the inner layer, the second support is preferably selected from an active alumina with a specific surface area between 50 and 200 $m^2/g$ stabilized with lanthana, while the second oxygen storage component is selected from ceria rich ceria/zirconia mixed oxides containing 60 to 90 wt. % of ceria additionally stabilized with 0.5 to 10 wt. % of praseodymia ($Pr_6O_{11}$). As discussed above, stabilization with praseodymia, or alternatively with yttria, neodymia or lanthana, can also be achieved by adding these compounds as highly dispersed components to the second layer.

For the purpose of suppressing the emission of hydrogen sulphide, the first and second layers of the catalytic coating may further comprise from about 1 to 40 g/l of a nickel, iron or manganese component.

The catalyst of the present invention may be manufactured in various ways. Some of them will be described below.

For providing the inner layer, the passage ways of the catalyst carrier can be coated with an aqueous coating composition comprising the particulate support materials of the inner layer (including the first oxygen storage material). The coating composition will also be called a "coating dispersion" in this application. The techniques for coating catalyst carriers with such a coating composition are well known to the expert. The coating is then dried and calcined in air. Drying is preferably done at elevated temperatures of up to 150° C. For calcining the coating, temperatures of from 200 to 500° C. for a period from 0. 1 to 5 hours should be applied.

After calcination, platinum may be dispersed onto the coated carrier body by dipping the monolith into a solution containing a precursor compound of platinum. The solution may be an aqueous or non-aqueous (organic solvent) solution. Any platinum precursor compound may be used, provided the compound is soluble in the chosen solvent and decomposes upon heating in air at elevated temperatures. Illustrative of these platinum compounds are chloroplatinic acid, ammonium chloroplatinate, platinum tetrachloride hydrate, platinum dichlorocarbonyl dichloride, dinitrodiamino platinum, platinum nitrate, platinum tetraammine nitrate and platinum tetraammine hydroxide. After impregnation, the coating is again calcined at temperatures between 200 and 500° C. in air.

Alternatively, the inner layer may be prepared by first impregnating the particulate materials of the inner layer with an aqueous solution of a soluble precursor compound of platinum, drying, and calcining the impregnated particulate materials to thermally fix platinum thereon. This material is then used to prepare the aqueous coating composition for coating the walls of the passage ways of the carrier body. The coating is then dried and calcined as described above.

In a preferred method for providing the inner layer there is prepared an aqueous dispersion from the particulate materials of the inner layer. For depositing and fixing platinum onto the particulate materials of the dispersion, a solution of platinum precursor compounds is injected slowly into the dispersion, and then the platinum compound is precipitated onto the particulate materials by properly adjusting the pH value of the dispersion to yield the final coating composition. During injection and precipitation, the dispersion is continuously agitated to rapidly distribute the injected solution homogeneously over the whole volume of the dispersion. The precipitated compounds firmly adhere to the supporting materials.

The method of precipitation by injection is described in German patent applications DE 197 14 732 A1 and DE 197 14 707 A1, which are relied on and incorporated herein by reference. In the following it is also called "injection precipitation."

Suitable platinum precursor compounds for this deposition method are those already described above. In addition, amine solubilized platinum compounds such as methylethanolamine platinum (IV) hexahydroxide (($MEA)_2Pt(OH)_6$= (($OH-C_2H_4-NH_2-CH_3)_2^{+Pt^{IV}}(OH)_6$) and ethanolamine platinum (IV) hexahydroxide (($EA)_2Pt(OH)_6$ =($OH-C_2H_4-NH_3)_2^+Pt^{IV}(OH)_6$) or other organic derivatives of quaternary ammonium salts may be used. These anionic complex compounds of platinum are known to yield platinum metal deposits of high dispersion.

The amine solubilised precursor compounds give highly basic aqueous solutions. When using alumina as support material, the amine solubilised precursor compounds are readily fixed onto the surface of alumina by adsorption. By neutralizing the dispersion, the adsorbed species can be fixed chemically.

The coating dispersion thus prepared is then used to coat the walls of the passage ways of the carrier body. Afterward, the coating is dried and calcined in air.

The above described method of injection precipitation is preferred because it involves only one drying and calcining step whereas the first two methods each require two drying and calcining steps.

Preferably, the first oxygen storage component for the lower layer is selected from a ceria rich ceria/zirconia mixed oxide stabilized with praseodymia. An already stabilized material may be used or stabilization may be effected in a separate manufacturing step. Ceria/zirconia may also be stabilized with praseodymia in situ during the preparation of the first layer. For that purpose, a solution of a praseodymia precursor compound may be prepared and ceria/zirconia is dispersed therein. Then ammonia is injected into the dispersion to precipitate the precursor compound onto ceria/zirconia. Suitable praseodymium precursor compounds are praseodymium acetate or nitrate.

The resulting dispersion is then used to prepare the final coating composition by further adding active alumina and optionally a particulate zirconia component. The particulate materials of this dispersion are then injected with platinum by the already discussed injection precipitation process.

After having deposited the inner layer onto the catalyst carrier the outer layer may be prepared as follows:

At first, the second support carrying platinum and rhodium is prepared by impregnating this support with an aqueous solution of soluble precursor compounds of platinum and rhodium, and drying and calcining the impregnated support. Thereafter the impregnated suppolt, the second oxygen storage compound and additional active alumina are dispersed in water to obtain a coating composition. This coating composition is used to apply the outer layer on top of said inner layer. Finally, the coated carrier body is again dried and calcined as described herein.

Suitable precursor compounds for platinum are those already mentioned above. As precursor for rhodium, hexaaminerhodium chloride, rhodium trichloride, rhodium carbonylchloride, rhodium trichloride hydrate, rhodium nitrate and rhodium acetate may be used advantageously, but rhodium nitrate is preferred.

The second support may be impregnated with platinum and rhodium precursors sequentially in any order or simultaneously from one common solution. However, as pointed out above, it is highly desirable to obtain a contact between platinum and rhodium as intimate as possible. It was found that this is best achieved by first depositing platinum and subsequently rhodium onto the support material by the above described injection precipitation. For that purpose, the precursor compound for platinum is selected from amine solubilized platinum like ethanolamine platinum (IV) hexahydroxide, and precipitation of platinum is effected by properly adjusting the pH-value of the dispersion. After the precipitation of platinum, the support is not dried and calcined but rhodium is then directly precipitated from a solution of an acidic precursor compound of rhodium such as rhodium nitrate.

For that reason, the aqueous coating dispersion for the outer layer is prepared by preparing a first aqueous dispersion from the second support material, preferably active alumina, and then injecting an aqueous solution of an amine solubilized precursor compound of platinum into the dispersion. The amine solubilized precursor compound of platinum is readily adsorbed onto the active alumina. Thereafter, an aqueous solution of an acidic precursor compound of rhodium is injected into this dispersion and the pH value of the dispersion is properly adjusted to fix the platinum and rhodium compounds onto the second support.

Thereafter, the second support material may be separated from the liquid phase of the first dispersion and dried and cacined before redispersing it together with the second oxygen storage component, and optionally additional active alumina, to form the coating dispersion for the outer layer. Most suitably, spray or flash calcination may be employed for calcining this second support material. In the case of spray or flash calcination, the wet material is injected into a hot stream of a gas with a temperature between 700 and 1000° C., giving rise to drying and decomposition of the precursor compounds within a few seconds or even within less than a second. This results in a high dispersion of the forming noble metal crystallites.

However, it is preferred to avoid the intermediate step of drying and calcining the second support material and to directly add the second oxygen storage component, and optionally additional active alumina, to the first dispersion containing the second support. This is possible because platinum and rhodium are fixed firmly to the second support material by the described injection precipitation.

The coating dispersion thus obtained is then used to apply the outer layer on top of the inner layer followed by drying and calcining the coated catalyst carrier. The latter preparation method for the outer layer is preferred over the formerly described method because it avoids the separate heat treatment of the second suppolt material.

The second oxygen storage component is preferably selected from a ceria/zirconia mixed oxide stabilized with praseodymia. Stabilization of ceria/zirconia can advantageously be achieved by the in situ method already described above. For that purpose, the solution of the praseodymium precursor compound, ceria/zirconia and optionally alumina are added to the dispersion containing alumina with the platinum and rhodium. The resulting dispersion is then used to apply the second coating layer. Upon calcination of this layer, the praseodymium precursor forms highly dispersed praseodymia on the surface of the particulate materials of the second layer. Thereby ceria/zirconia gets stabilized against thermal stresses, and in addition, the oxygen storage capacity of the catalyst is enhanced by the oxygen storage capacity of praseodymia.

In summary, in a most preferred embodiment of the invention, the inner layer of the catalyst comprises platinum deposited on active alumina and on ceria rich ceria/zirconia mixed oxide, and the outer layer of the catalyst comprises platinum and rhodium deposited on active alumina and the outer layer further comprises ceria rich ceria/zirconia mixed oxide. This catalyst is obtainable by the following process steps:

a) preparing a solution of a praseodymium precursor, adding ceria/zirconia mixed oxide and adjusting the pH value of the dispersion to thereby precipitate the praseodymium precursor onto ceria/zirconia, b) further adding alumina and optionally a zirconia component to the dispersion of step a), c) injecting a solution of a platinum precursor into the dispersion of step b) and precipitating it onto alumina, ceria/zirconia and optionally the zirconia component to obtain a first coating composition for the inner layer of the catalyst, d) coating a monolithic carrier with said first coating composition and drying and calcining the coating to thereby obtain a carrier coated with said inner layer, e) preparing a dispersion of active alumina and injecting a solution of a platinum compound into this dispersion, f) thereafter injecting an aqueous solution of a soluble rhodium precursor into the dispersion from step e) and adjusting the pH value of the dispersion to thereby obtain a dispersion of active alumina containing platinum and rhodium, g) adding active alumina, ceria rich ceria/zirconia mixed oxide and optionally a solution of a praseodymium precursor to the dispersion of step f) to obtain a second coating composition for the outer layer of the catalyst, h) using said second coating composition to apply said outer layer on top of said inner layer, and i) drying and calcining the coated monolithic carrier.

Most preferably, the active alumina used for the inner and outer layers in the process above is stabilized with 0.5 to 20 wt. % of lanthana. In the above described method, the support materials and ceria/zirconia are in situ stabilized with praseodymia. Alternatively, stabilization of ceria/zirconia with praseodymia, yttria, neodymia, lanthana or mixtures thereof may be achieved in a separate step with the above doping compounds by impregnation, injection precipitation, co-precipitation, or co-thermohydrolysis.

For stabilizing ceria/zirconia by impregnation, the particulate ceria/zirconia is wetted with an aqueous solution of precursor compounds of the desired doping element and then dried and calcined. Frequently, pore volume impreg nation is employed for that purpose. In that case the precursor compounds are solved in an amount of water which corresponds to the water absorption capacity of the ceria/zirconia.

Injection precipitation has already been explained above for the deposition of the noble metal compounds onto the support materials.

For stabilizing ceria/zirconia by co-precipitation, a common solution is prepared from ceria and zirconia precursor compounds and from a precursor compound of the stabilizing element. Then the three compounds are simultaneously precipitated by adding a suitable precipitating agent. Thus, ceria/zirconia stabilized with praseodymium may be manufactured by preparing a common solution of cerium nitrate, zirconium nitrate and praseodymium nitrate, and adding ammonium carbonate or ammonium oxalate so that cerium, zirconium and praseodymium are precipitated simultaneously as carbonates or oxalates. After filtration and drying, the desired stabilized ceria/zirconia is obtained by calcination. Alternatively, co-precipitation can also be effected in a basic medium.

For stabilizing ceria/zirconia by co-thermohydrolysis, a sol is prepared from cerium hydroxynitrate, zirconium hydroxynitrate and the hydroxynitrate of the doping element. Then the sol is dewatered by increasing the temperature. Thereby the hydroxynitrates are decomposed to form the corresponding oxides. Co-thermohydrolysis is described e.g. in WO 98/16472.

EXAMPLES

The beneficial properties of the catalyst according to the invention will now be explained further with the help of the following examples.

FIG. 1 shows a schematic representation of the measuring principle for determining CO/NOx cross-over points.

Comparison Example 1

A conventional single layer platinum/rhodium catalyst CC1 (comparison catalyst 1) was prepared as follows:

Cerium and zirconium carbonate were treated with water and acetic acid overnight at room temperature to partly form the corresponding acetates. To the resulting dispersion, stabilized alumina and bulk low surface area ceria were added. After wet milling, a monolithic carrier was coated with the slurry by a conventional dipping technique. The coated substrate was dried in air and calcined for 2 hours at 500° C. in air.

The total washcoat uptake of the carrier was 205 g/l, consisting of 112 g/l stabilized alumina, 34 g/l of bulk ceria, 34 g/l of ceria and 25 g/l zirconia, both latter compounds originating from acetate precursors.

The washcoat layer was impregnated with chloride free platinum and rhodium salts (platinum tetraammine nitrate and rhodium nitrate). The mass ratio between platinum and rhodium was 5Pt/1Rh at a concentration of 1.41 g/l (40 g/ft$^3$).

The final catalyst had the composition given in table 1.

TABLE 1

Composition of comparison catalyst CC 1

| component | concentration [g/l] |
|---|---|
| alumina (stabilized with wt.-% La$_2$O$_3$) | 112 |
| CeO$_2$ (bulk) | 34 |
| CeO$_2$ (ex acetate) | 34 |
| ZrO$_2$ (ex acetate) | 25 |
| total oxide content | 205 |
| platinum | 1.175 |
| rhodium | 0.235 |
| total noble metal content | 1.41 |

Example 1

A double layer catalyst C1 according to the invention was prepared as follows:

Preparation of First (inner) Layer:

To a solution of praseodymium acetate, a cerium rich oxygen storage component (70 wt % ceria, 30 wt % zirconia) was added. By controlled injection of ammonia and stirring for about 30 minutes, praseodymium acetate was precipitated onto ceria/zirconia. Subsequently, stabilized alumina (3 wt-% La$_2$O$_3$, 97 wt-% Al$_2$O$_3$) and bulk zirconia were added. After this, a platinum solution ((EA)$_2$Pt(OH)$_6$) was injected into the slurry and platinum was precipitated onto alumina and ceria/zirconia by proper adjustment of the pH-value of the dispersion with acetic acid. After milling the slurry, a monolithic carrier was dipped into the slurry to apply the first layer.

The complete washcoat uptake was 160 g/l. Finally, the first layer was dried and thereafter calcined in air at 500° C.

Preparation of Second (outer) Layer:

Stabilized alumina (4 wt-% La$_2$O$_3$, 96 wt-% Al$_2$O$_3$) was dispersed in water. Thereafter, a chloride free platinum salt ((EA)$_2$Pt(OH)$_6$) was injected and was readily adsorbed onto the alumina. Thereafter, rhodium nitrate was injected. By adjusting the pH value, both catalytic components were fixed onto the supporting alumina.

To finish the washcoat alumina, praseodymium acetate and a ceria rich oxygen storage component (70 wt % ceria, 30 wt % zirconia) were introduced.

Before coating a monolithic substrate, the slurry was adjusted to a pH of approximately 6 and milled. The total washcoat uptake of the second layer was 70 g/l. The catalyst was dried and calcined at 500° C. in air.

The final catalyst had the composition given in tables 2 and 3.

TABLE 2

Composition of inner layer of catalyst C1

| component | concentration [g/l] |
|---|---|
| alumina (stabilized with 3 wt.-% La$_2$O$_3$) | 80 |
| CeO$_2$/ZrO$_2$ (70 wt.-% CeO$_2$; 30 wt.-% ZrO$_2$) | 51.7 |
| Pr$_6$O$_{11}$ | 4.3 |
| ZrO$_2$ | 24 |
| total oxide content | 160 |
| platinum | 0.94 |

TABLE 3

Composition of outer layer of catalyst C1

| component | concentration [g/l] |
|---|---|
| alumina (stabilized with 3 wt.-% $La_2O_3$) | 10 |
| $CeO_2/ZrO_2$ (70 wt.-% $CeO_2$; 30 wt.-% $ZrO_2$) | 18.5 |
| $Pr_6O_{11}$ | 1.5 |
| alumina (unstabilized) | 40 |
| total oxide content | 70 |
| platinum | 0.235 |
| rhodium | 0.235 |
| total noble metal content | 0.47 |

The mass ratio of platinum to rhodium was 1Pt/1Rh in the top layer. The total platinum and rhodium content was 1.41 g/l (1. 175 g Pt/l and 0.235 g Rh/l) at a mass ratio of 5Pt/lRh (combined mass ratio for both layers).

Comparison Example 2

A double layer catalyst CC2 was prepared in the same way as the catalyst from example 1. Contrary to example 1, platinum in the first layer was deposited in a separate preparation step onto alumina only before the coating slurry for the first layer was prepared.

Comparison Example 3

A double layer catalyst CC3 was prepared in the same way as the catalyst from example 1. Contrary to example 1, the total amount of platinum was applied to the first layer only. Thus, in the resulting comparison catalyst platinum and rhodium were completely separated from each other.

Evaluation of Catalysts a) Engine Tests:

The catalysts according to the above examples and comparison examples were first aged at an internal combustion engine (engine displacement: 2.8 1) during 76 hours, at an exhaust gas temperature in front of the catalysts of 850° C. Thereafter, the light off temperatures for the conversion of HC, CO and $NO_x$ and the $CO/NO_x$ cross-over points were determined. The term "light off temperature" designates the exhaust gas temperature at which 50% of the respective pollutant is converted by the catalyst. The light off temperature may be different for HC, CO and $NO_x$.

Two separate aging runs were performed. In the first run, a sample of catalyst C1 and comparison catalyst CC1 were aged together, while in the second run another sample of catalyst C1 was aged together with comparison catalysts CC2 and CC3. Since aging runs cannot be reproduced exactly, the catalysts from the two aging runs differ slightly. Therefore, only the catalysts aged within the same aging run can be directly compared to one another.

The light off tests were performed at a space velocity of 65000 $h^{-1}$ with gradually increasing exhaust gas temperature (38 K/min) of the engine.

Measurement of CO/NOx cross-over points is schematically shown in FIG. 1. The lambda-value of the air/fuel mixture supplied to the engine is periodically changed from 0.98 (rich air/fuel mixture) to 1.02 (lean air/ftiel mixture) and vice versa. The residence times at $\lambda=0.98$ and $\lambda=1.02$ were set to 1 minute each. Changeover from rich to lean and back again was done within 3 minutes. The corresponding lambda-sweep is shown in FIG. 1 (lower curve). The associated conversion curves for CO and $NO_x$ are also shown in FIG. 1. During the lean period, CO-conversion is virtually 100%, and drops to approximately 50 to 60% during the rich period. The conversion curve for $NO_x$ behaves in a reciprocal manner. During the rich period $NO_x$-conversion approximates 100%, while during the lean period $NO_x$-conversion drops down to values between 50 and 60%. At a lambda value of 1 both conversion curves cross each other. The corresponding conversion value is the highest conversion which can be achieved simultaneously for CO and $NO_x$. The higher this cross-over point the better is the dynamic behaviour of the catalytic activity of the catalyst.

The just-described determination of the cross-over point uses a so-called static lambda-sweep. A dynamic lambda-sweep can also be used. In that case, the sweep curve for the lambda value is additionally modulated with a frequency of 1 Hz or 0.5 Hz. The amplitude may be ±1 A/F or ±0.5 A/F (air/fuel). This amplitude usually is larger than the amplitude of the sweep curve of ±0.02 λ, corresponding to an A/F-amplitude of ±0.3.

The dynamic cross-over points for the catalysts of the preceding examples were measured at a space velocity of 65000 $h^{-1}$ and at 450° C. and 400° C. exhaust gas temperature. At 450° C. exhaust gas temperature the air/fuel-ratio was modulated with a frequency of 1 Hz and an amplitude of 1 A/F (1 Hz±1 air/fuel). At 400° C. exhaust gas temperature the modulation amplitude was reduced to 0.5 A/F (1 Hz±0.5 air/fuel).

The measured results are listed in tables 4 and 5. Table 4 compares the catalysts which were aged during the first aging run while table 5 compares the catalysts aged during the second aging run:

TABLE 4

| | $T_{50}$ [° C.] | | | $CO/NO_x$ [%] | |
|---|---|---|---|---|---|
| catalyst | HC | CO | $NO_X$ | 1 Hz ± 1 A/F | 1 Hz ± 0.5 A/F |
| C1 | 360 | 363 | 354 | 84 | 88 |
| CC1 | 387 | 407 | 382 | 76 | 62 |

CC: comparison catalyst; C: catalyst; $T_{50}$: light off temperature for 50% conversion

TABLE 5

| | $T_{50}$ [° C.] | | | $CO/NO_x$ [%] | |
|---|---|---|---|---|---|
| catalyst | HC | CO | $NO_X$ | 1 Hz ± 1 A/F | 1 Hz ± 0.5 A/F |
| C1 | 366 | 355 | 354 | 90 | 87 |
| CC2 | 373 | 374 | 359 | 85 | |
| CC3 | 389 | 391 | 379 | 72 | 79 | b) Model Gas Tests:

After aging the catalysts of example 1 and comparison example 3 for 16 hours at 985° C. in a lean synthesis gas mixture containing 6 vol.-% $O_2$, 10 vol.-% $H_2O$, 20 ppm $SO_2$, balance $N_2$, the $CO/NO_x$ cross-over points were determined at a gas temperature of 400° C. and a space velocity of 100000 $h^{-1}$. The cross-over points were determined for three different concentrations of $SO_2$ of the gas mixture (0, 5 and 20 ppm). The results are given in Table 6:

TABLE 6

| | CO/NO$_x$ [%] | | |
|---|---|---|---|
| catalyst | 0 ppm SO$_2$ | 5 ppm SO$_2$ | 20 ppm SO$_2$ |
| C1 | 65 | 61 | 52 |
| CC3 | 42 | 35 | 30 |

Example 2

A further set of 4 different catalysts, C2, C3, C4 and C5, were prepared according to example 1. Differently from example 1, all catalysts were manufactured with a total noble metal loading of 2.12 g/l (60 g/ft$^3$). The weight ratio of platinum to rhodium in the upper layer was varied to determine its influence on the catalytic properties of the catalysts. The noble metal distribution of these catalysts is listed in table 7.

TABLE 7

| | Noble Metal Distribution | | | | |
|---|---|---|---|---|---|
| | inner layer | outer layer | outer layer | both layers | |
| Catalyst | Pt [g/l] | Pt [g/l] | Rh [g/l] | Pt/Rh | Pt/Rh |
| C2 | 1.41 | 0.35 | 0.35 | 1:1 | 5:1 |
| C3 | 1.73 | 0.035 | 0.35 | 1:10 | 5:1 |
| C4 | 0.71 | 1.06 | 0.35 | 3:1 | 5:1 |
| C5 | 1.77 | 0.0 | 0.35 | 0:1 | 5:1 |

Before determining the CO/NO$_x$ cross-over points, all four catalysts were aged for 12 hours at an exhaust gas temperature in front of the catalysts of 1100° C. in a synthetic gas mixture of 6 vol.-% oxygen, 10 vol.-% water vapour, 20 ppm sulphur dioxide, balance nitrogen.

The static cross-over points of these catalysts were determined at an exhaust gas temperature of 400° C. and a space velocity of 100000 h$^{-1}$. During the test the lambda value of the exhaust gas was increased from 0.98 to 1.02 within 5 minutes. At 1.02 the lambda value was kept constant for 1 minute. Then the lambda value was lowered again to 0.98 in 5 minutes. After a dwell time of 1 minute, the described cycle was repeated again for 2 times. The CO/NO$_x$ cross-over values given in table 8 are mean values from the last two test cycles.

TABLE 8

CO/NO$_x$ cross-over points

| catalyst | CO/NO$_x$ [%] static |
|---|---|
| C2 | 90 |
| C3 | 55 |
| C4 | 94 |
| C5 | <30*) |

*): no cross-over point

For these measurements, the model gas had the following composition:

| CO | 1.40 vol.-% | H$_2$ | 0.47 vol.-% |
|---|---|---|---|
| NO | 0.1 vol.-% | CO$_2$ | 14.0 vol.-% |
| SO$_2$ | 20 ppm | H$_2$O | 10 vol.-% |
| C$_3$H$_6$ | 666 ppm | C$_3$H$_8$ | 333 ppm |
| O$_2$ | 0.93–1.77 vol.-% | N$_2$ | balance |

For performing the lambda-sweep the oxygen content of the model gas was varied between 0.93 and 1.77 vol.-%.

Example 3

Two further catalysts, C6 and C7, with a total noble metal loading of 1.41 g/l (40 g/ft$^3$), were prepared according to example 1. For the preparation of catalyst C6, example 1 was exactly duplicated, while for the preparation of catalyst C7 the sequence of platinum and rhodium impregnation for the second support was inverted. First, rhodium was deposited onto the activated alumina support and only thereafter platinum.

Both catalysts were tested for their CO/NO$_x$ cross-over behaviour and their light off temperatures. The results are given in table 9.

TABLE 9

| | T$_{50}$[° C.] | | | CO/NO$_x$[%] | | |
|---|---|---|---|---|---|---|
| | | | | 1 Hz ± 0.25 | 1 Hz ± 0.5 | 1 Hz ± 1 |
| catalyst | HC | CO | NO$_x$ | A/F | A/F | A/F |
| C6 | 360 | 362 | 354 | 99 | 95 | 90 |
| C7 | 359 | 355 | 353 | 97 | 90 | 82 |

From the results of table 9 it can be seen that the dynamic behaviour of catalyst C6 is much better than that of C7. Without wanting to be bound by any theory, this effect may be explained by a more intimate contact between platinum and rhodium if platinum is deposited first and then rhodium.

Example 4

Four further catalysts, C8, C9, C10 and C11, were prepared according to example 1 with the following alterations:

The total noble metal loading was set to 1.77 g/l (50 g/ft$^3$). The platinum/rhodium ratio was changed to 3:2. In addition, different amounts of MnO$_2$ and NiO were added in particulate form to the coating dispersions for the inner layers of catalysts C9 to C11. These hydrogen sulfide suppressing components were added to the coating dispersions after the injection of the platinum compound.

For measuring the hydrogen sulfide emission of these catalysts, they were first loaded under lean conditions with sulphur (space velocity 65000 h$^{-1}$; temperature 550° C.; lambda 1.01; approximate sulfur content of fuel: 200 ppm; approximate loading time >0.5 h). Thereafter, the lambda value was lowered to 0.88, and the emission of hydrogen sulfide was measured with an online mass spectrometer. The peak maximum of hydrogen sulfur emission is listed in table 10 for the catalysts C8 to C11.

TABLE 10 suppression of $H_2S$-emission by $MnO_2$ and NiO

| Catalyst | both layers Pt/Rh | totalPt + Rh [g/l] | inner layer $H_2S$ suppressing component[g/l] | $H_2S$ maximum [ppm] |
|---|---|---|---|---|
| C8 | 3:1 | 1.77 | | 750 |
| C9 | 3:2 | 1.77 | 20 $MnO_2$ | 380 |
| C10 | 3:2 | 1.77 | 40 $MnO_2$ | 330 |
| C11 | 3:2 | 1.77 | 5 NiO | 100 |

Example 5

The catalysts according to the invention do not contain palladium. Nevertheless, they have proved to yield comparably low emissions of hydrocarbons, carbon monoxide and nitrogen oxides as do catalysts using palladium and rhodium.

A further object of the invention was to reduce the costs for the platinum group metals (PGM) of the novel platinum/rhodium catalysts as compared to conventional double layer palladium/rhodium catalysts given the PGM prices as of April 1999. Therefore, catalysts according to example 1 with different total noble metal loading and varying platinum/rhodium ratio were prepared and compared with respect to exhaust gas cleaning activity and PGM-costs.

The catalysts were tested on an EU-II certified vehicle as main underfloor catalysts with a ratio of catalyst volume/engine capacity of 0.67. All catalysts were measured following aging of 16 hours at 985° C. with 10% by volume water in nitrogen. The tests were carried out with stoichiometric cold start according to the new European test cycle MVEG-EU III.

The relative emissions are given in Table 11 with the values for the palladium/rhodium comparison catalyst (14Pd/1Rh) set to 100:

TABLE 11

Relative emissions versus PGM-costs

| Total PGM Loading [g/l] | PGM ratio | Relative Emissions | | | PGM Costs |
|---|---|---|---|---|---|
| | | HC | CO | $NO_x$ | |
| 3.53 | 14Pd/1Rh | 100 | 100 | 100 | 100 |
| 1.41 | 5Pt/1Rh | 119 | 110 | 112 | 51 |
| 1.77 | 3Pt/2Rh | 92 | 91 | 83 | 75 |
| 3.32 | 45Pt/2Rh | 128 | 108 | 110 | 108 |
| 3.89 | 9Pt/2Rh | 80 | 75 | 56 | 142 |

As shown in table 11, the conversion of HC, CO and $NO_x$ is strongly influenced by the rhodium loading, and that for a given emission target, reducing the platinum content in favor of the rhodium content is beneficial. While, for example, a rhodium-enriched loading of 1.77 g/l (3Pt/2Rh) in the EU-II certified vehicle shows lower emissions for all three pollutant components compared with the Pd/Rh reference (3.53 g/l, 14Pd/1Rh), the 3.32 g/l (45Pt/2Rh) variant with high platinum content, falls behind the results of the 1.77 g/l loading (3Pt/2Rh), despite higher overall loading and distinctly higher precious metal costs.

Further variations and modifications of the foregoing will be apparent to those skilled in the art and are intended to be encompassed by the claims appended hereto.

European priority document 99 108 061.5 is relied upon, and incorporated herein by reference in its entirety.

We claim:

1. A catalyst for treating exhaust gas from an internal combustion engine, comprising:
   a carrier body;
   an inner layer, deposited on said carrier body, said inner layer comprising platinum deposited on a first support material and on a first oxygen storage component; and
   an outer layer, deposited on said inner layer, said outer layer comprising platinum and rhodium deposited on a second support material and on a second oxygen storage component.

2. The catalyst according to claim 1, wherein
   said first and said second support materials are the same or different, and comprise at least one compound selected from the group consisting of silica, alumina, titania, zirconia, mixed oxides or mixtures thereof, and zirconia-rich zirconia/ceria mixed oxide.

3. The catalyst according to claim 1, wherein said first and said second support materials comprise activated alumina stabilized with from 0.5 to 20 wt. % lanthana.

4. The catalyst according to claim 3, wherein said first support material further comprises a zirconia component.

5. The catalyst according to claim 1, wherein said first and said second oxygen storage components comprise ceria-rich ceria/zirconia mixed oxide compounds.

6. The catalyst according to claim 5, wherein said ceria-rich ceria/zirconia mixed oxide compounds further comprise at least one member selected from the group consisting of praseodymia, yttria, neodymia, lanthana and mixtures thereof.

7. The catalyst according to claim 6, wherein said outer layer further comprises activated alumina.

8. The catalyst according to claim 1, wherein said outer layer further comprises at least one member selected from the group consisting of yttria, neodymia, lanthana, and praseodymia.

9. The catalyst according to claim 1, wherein said platinum and said rhodium present on said second support are in intimate contact.

10. The catalyst according to claim 1, wherein said caltier body comprises a honeycomb with a plurality of substantially parallel passage ways extending therethrough, said passage ways being defined by walls onto which said inner layer is applied in an amount of from about 50 to 250 g/l of the carrier body, and wherein said outer layer is afterward applied to the inner layer in an amount of from 10 to 150 g/l of the carrier body.

11. The catalyst according to claim 10, wherein said first support material is present in an amount from 20 to 150 g/l of the carrier body, said first oxygen storage component is present in an amount from 10 to 100 g/l of the carrier body, and said inner layer includes zirconia in an amount from 5 to 60 g/l of the carrier body.

12. The catalyst according to claim 11, wherein said platinum present in said inner layer is present in a concentration of from 0.01 to 5 wt. % relative to a total weight of said inner layer.

13. The catalyst according to claim 12, wherein said second support material is present in an amount of from 5 to 100 g/l of the carrier body, said second oxygen storage component is present in an amount of from 5 to 100 g/l of the carrier body, and said outer layer includes activated alumina present in an amount of from 5 to 60 g/l of the carrier body.

14. The catalyst according to claim 13, wherein said platinum and rhodium present in said outer layer are present in a concentration of from 0.5 to 20 wt. % relative to a total weight of said outer layer, and a platinum/rhodium mass ratio thereof is in the range of from 5:1 to 1:3.

15. The catalyst according to claim 14, wherein at least one of said inner and outer layers further comprises a component selected from the group consisting of nickel, iron and manganese components present in an amount of from about 1 to 40 g/l of the carrier body.

16. A method for manufacturing the catalyst according to claim 1, comprising:
   providing a carrier body having passage ways therein defined by walls;
   coating the walls of the passage ways of the carrier body with a coating slurry comprising particulate materials of a first suppolt material and a first oxygen storage component;
   drying and calcining said coating slurry on said carrier body;
   dipping the coated carrier body into a solution of a precursor compound of platinum;
   again calcining the coated carrier body to form an inner layer; and
   applying an outer layer on top of the inner layer.

17. The method for manufacturing a catalyst according to claim 16, wherein said applying an outer layer comprises:
   impregnating a second suppolt material with a solution of a precursor compound of platinum and rhodium;
   drying and calcining the impregnated second support material to thereby obtain a dried and calcined impregnated second suppolt material;
   preparing an aqueous coating composition comprising said dried and calcined impregnated second suppolt material, a second oxygen storage component and active alumina;
   coating said carrier body having the inner layer thereon; and
   further drying and calcining the carrier body having the inner layer coated with the outer layer.

18. The method according to claim 16, wherein said applying an outer layer comprises:
   preparing a dispersion from particulate material of a second suppolt material and a solution of a platinum precursor compound;
   thereafter injecting a solution of a precursor compound of rhodium into said dispersion;
   adjusting a pH value of said dispersion by adding acid to thereby precipitate platinum and rhodium onto said second support material;
   preparing a coating composition from the pH value adjusted dispersion by adding a second oxygen storage compound and active alumina to the dispersion;
   coating said carrier body having the inner layer thereon with said coating composition; and
   drying and calcining the coated carrier body.

19. A method for manufacturing the catalyst according to claim 1, comprising:
   impregnating a first support material and a first oxygen storage component material with a solution of a precursor compound of platinum;
   drying and calcining said impregnated first support material to thermally fix platinum thereon;
   providing a carrier body having passage ways defined by walls;
   coating the walls of the passage ways of the carrier body with an aqueous coating composition containing said dried and calcined impregnated first support material;
   drying and calcining said coating to form an inner layer; and
   applying an outer layer on top of the inner layer.

20. A method for manufacturing the catalyst according to claim 1, comprising:
   preparing a dispersion from particulate materials of a first support material and a first oxygen storage component;
   injecting a solution of a platinum precursor compound into said dispersion;
   fixing the platinum compound on the particulate materials by adjusting the pH value of the dispersion to thereby obtain a coating composition;
   providing a carrier body having passage ways defined by walls;
   coating the walls of the passage ways of the carrier body with the dispersion;
   drying and calcining said coating on said carrier body to form an inner layer; and
   applying an outer layer on top of the inner layer.

21. The catalyst according to claim 1, wherein said inner layer comprises platinum deposited on active alumina and on ceria rich ceria/zirconia mixed oxide, and wherein said outer layer comprises platinum and rhodium deposited on active alumina, and said outer layer further comprises ceria rich ceria/zirconia mixed oxide, said catalyst prepared by a process comprising:
   preparing a first coating composition by:
      preparing a solution of a praseodymium precursor;
      adding ceria/zirconia mixed oxide to the solution to thereby produce a first dispersion;
      adjusting a pH value of the first dispersion to thereby precipitate the praseodymium precursor onto the ceria/zirconia;
      adding active alumina to the first dispersion; and
      injecting a solution of a platinum precursor compound into the first dispersion thereby precipitating said platinum precursor compound onto the alumina and the ceria/zirconia to obtain the first coating composition;
   coating a monolithic carrier body with said first coating composition;
   drying and calcining the coated monolithic carrier body to thereby obtain a carrier coated with said inner layer;
   preparing a second coating composition by:
      preparing a second dispersion including active alumina injected with a solution of a platinum compound;
      thereafter injecting a solution of a rhodium precursor compound into the second dispersion;
      adding an acid to the second dispersion to precipitate platinum and rhodium onto said active alumina; and
      adding additional active alumina and ceria rich ceria/zirconia mixed oxide to the second dispersion to obtain the second coating composition;
   applying said second coating composition on top of said inner layer of said carrier body; and
   drying and calcining the coated monolithic carrier body.

22. The catalyst according to claim 21, wherein the active alumina used in the first dispersion and the second dispersion is stabilized with 0.5 to 20 wt. % of lanthana.

23. The catalyst according to claim 21, wherein a further zirconia component is added with the active alumina of the first coating composition.

24. The catalyst according to claim 21, wherein a solution of a praseodymium precursor compound is added with the active alumina to the second dispersion of the second coating composition.

25. A method of treating exhaust gas from an internal combustion engine, comprising:

exposing the exhaust gas to the catalyst according to claim 1, to thereby oxidize hydrocarbons and carbon monoxide contained in the exhaust gas and reduce nitrogen oxides contained in the exhaust gas.